Walter B. Ford
Gerald R. Schlechte
INVENTORS

United States Patent Office 3,277,438
Patented Oct. 4, 1966

3,277,438
METHOD AND APPARATUS FOR PROGRAMMED GAIN CONTROL OF A SEISMIC AMPLIFIER
Walter B. Ford, Irving, and Gerald R. Schlechte, Dallas, Tex., assignors to Texas Instruments Incorporated, Dallas, Tex., a corporation of Delaware
Filed June 27, 1963, Ser. No. 290,989
11 Claims. (Cl. 340—15.5)

This invention relates to a method of and apparatus for controlling gain of an amplifier and more particularly to a method and apparatus for controlling the gain of a seismic amplifier according to a pre-selected function after the arrival of the seismic signal at the amplifier, wherein the initial gain of the amplifier at the initiation of said pre-selected function is determined according to the initial magnitude of the incoming seismic signal.

The patent to White et al. No. 3,083,341, entitled "Method and Apparatus of Controlling Gain of an Amplifier," issued March 26, 1963, and assigned to the assignee of the present invention, discloses the concept of programmed grain control of seismic amplifiers. This patent discloses the desirability of varying the gain of seismic amplifiers according to a pre-selected function independent of the seismic signal, and the term "programmed gain control" denotes the method and apparatus for so doing. Normally, the signal resulting from a seismic explosion reaching the seismic amplifier decreases in amplitude at an exponential rate. In order to maintain the recorded seismic signal at a constant amplitude the pre-selected function of the programmed gain control is likewise an exponential function, and therefore the gain of the seismic amplifier is increased at an exponential rate in order to offset the decrease of the amplitude of the seismic signal.

There are three functions of the programmed gain control that must be pre-selected prior to the shooting of a seismic signal. These functions are, respectively, the initial gain, the time rate of change of the gain, and the ultimate gain. The time rate of change of the gain will determine the characteristic of the pre-selected function used to control the gain of the seismic amplifier. The ultimate gain is the highest gain achieved by the amplifier during the recording of the seismic signal. The initial gain is determined by the initial magnitude of the pre-selected function used to control the gain of the amplifier. Although the rate at which the amplitude of the seismic signal decays as a function of time can be readily determined and, therefore, the time rate of change of the pre-selected function for controlling the gain of the amplifier can likewise be readily determined, it is very difficult to determine the initial magnitude of the incoming seismic signal in order to intelligently set the initial gain of the amplifier. For example, an arbitrary initial gain setting of a programmed gain control can cause the electronic seismic recording equipment to be overdriven if the initial amplitude of the incoming seismic signal is too large. On the other hand, a seismic signal of very low initial amplitude may result in an insufficient amount of gain of the programmed gain control is arbitrarily set too low. Thus there is a need for accurately determining the initial amplitude of the incoming seismic signal in order that the initial gain of the programmed gain control may be set at the proper magnitude.

In utilizing programmed gain control in recording of seismic signals, it is customary to maintain the seismic amplifiers at a very low gain between the time of the seismic explosion and the time that the reflected seismic signals arrive at the seismometer array. This period is referred to as the breaks; and any signal arriving at the seismometer array during this time is mainly comprised of surface noise. Thus the desirability of initially suppressing the noise during the first breaks by maintaining the seismic amplifiers at a very low gain is readily apparent, this being commonly referred to as pre-suppression. At about the time of the initial arrival of the seismic signals at the seismometer array, the programmed gain control becomes effective to control the gain of the amplifiers according to the pre-selected function above referred to. Likewise, it is at this time that the difficulty is experienced in setting the initial gain of the seismic amplifiers.

It is therefore the principal object of this invention to provide a method of apparatus for controlling the gain of a seismic amplifier according to a programmed gain control, wherein the initial gain of the programmed gain control is determined as a function of the initial amplitude of the incoming seismic signal.

An additional object is to provide a method and apparatus according to the above-stated object wherein the rate of change of the gain of the seismic amplifier from its pre-suppression gain to the initial gain can be veried to prevent exceeding the gain response of the amplifier.

In accordance with one embodiment of the invention, the amplitude of the incoming seismic signal is sampled for a short period upon its initial arrival during which time the seismic amplifiers are maintained at a low gain to suppress any undesired noise. A signal proportional to the sampled amplitude is then used to set the initial gain of the programmed gain control at the proper magnitude. The programmed gain control is then initiated to vary the gain of the seismic amplifiers according to a pre-selected function. Thus, the initial gain of the amplifiers is selected intelligently according to the amplitude of the seismic signals, and consequently, the seismic amplifiers are not overdriven nor is the seismic signal recorded at an insufficient gain.

The preferred embodiment of the invention utilizes an additional refinement in the transition between the pre-suppression period and the initial gain of the programmed gain control. The amplitude of the seismic signal is likewise initially sampled in order to determine the initial gain of the programmed gain control. However, the initial amplitude of the seismic signal is used to control the gain of the seismic amplifiers for a short period starting at the time of the arrival of the seismic signal up to the time when the gain of the amplifiers is controlled by programmed gain control. This is conventionally referred to as automatic gain control. At the same time, the output of the programmed gain control is varied as a function of the initial amplitude of the seismic signal. When the programmed gain control is initiated, its initial gain is automatically set at the pre-existing gain of the amplifiers as determined by the amplitude of the seismic signal. This latter and preferred embodiment is effective in preventing the gain response of the amplifier from being exceeded from the gain at the pre-suppression period to the initial gain of the programmed gain control.

Other objects, features and advantages will become apparent from the following description when taken in conjunction with the appended claims and the attached drawing in which like reference numerals refer to like parts throughout the several figures, and in which:

Figure 1:
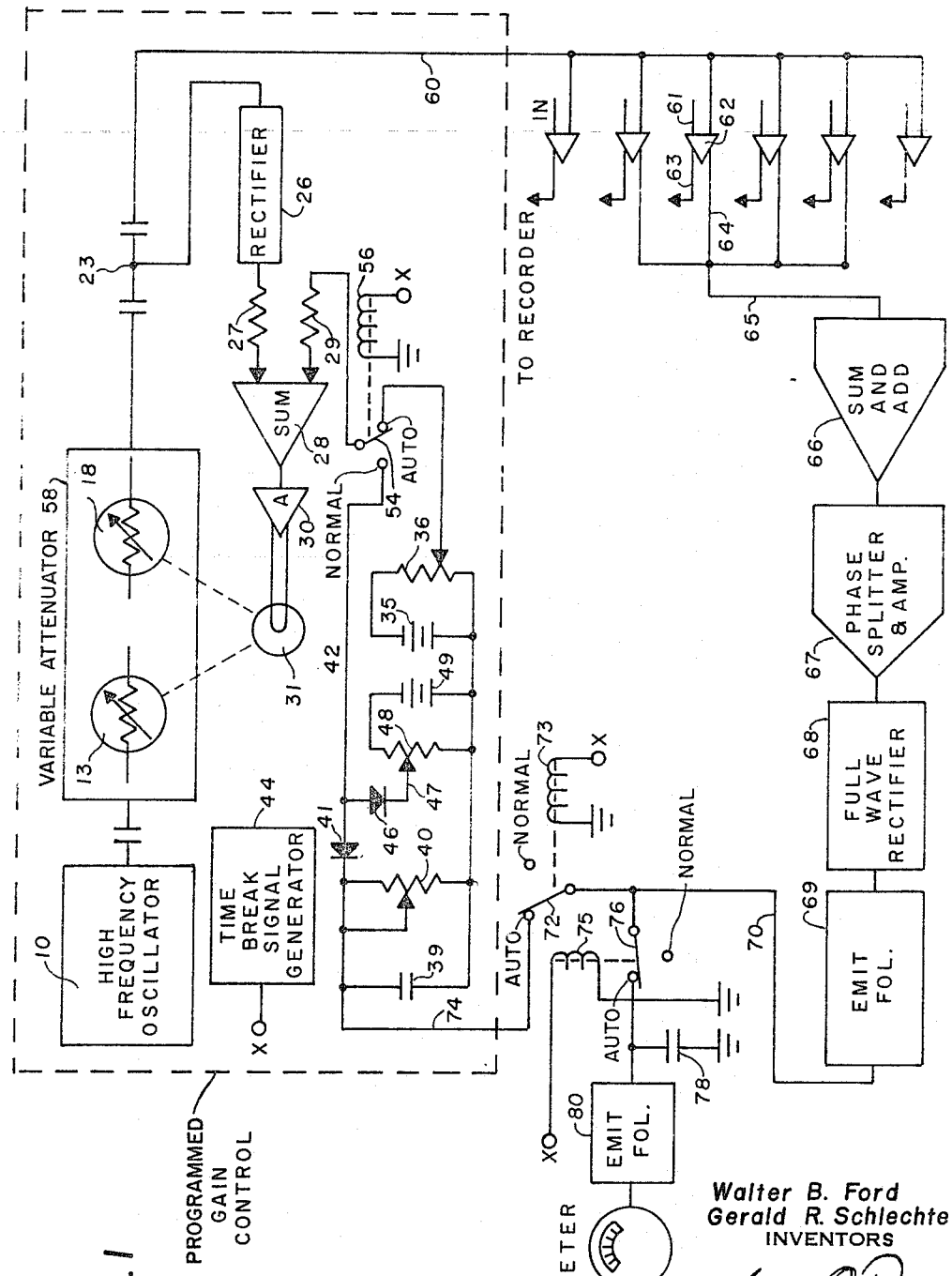
FIGURE 1 is a schematic representation of illustrative circuitry for carrying out the broad method of this invention.

Referring to FIGURE 1 the part of the schematic enclosed by the dotted line and labeled "programmed gain control" is the same as that shown in the copending application of Ford et al. entitled "Gain Control Signal Generator," Serial No. 117,561, filed June 16, 1961, and now Patent No. 3,202,926, assigned to the assignee of the present invention. The copending application discloses a system for generating a high frequency signal which decays in amplitude according to a pre-selected function for use in a programmed gain control system for seismic signal amplifiers, and describes a preferred embodiment of electronic circuitry for providing programmed gain control according to the basic concept as set forth in the White et al. patent, supra. As disclosed in the copending Ford et al. application, the programmed gain control system provides a high frequency output signal, in this instance 7.5 kc., that decays in amplitude according to a pre-selected function, namely, an exponential function. The high frequency signal is applied to output line 60 to the input of the seismic amplifiers 62 to control the gain thereof as described in the White et al. patent, supra. These seismic amplifiers utilize an auxiliary high frequency signal for gain control purposes and include gain control arrangements adapted to vary the gain of the amplifiers in inverse proportion to the amplitude of the auxiliary high frequency gain control input signal from the programmed gain control.

Briefly, the operation of the programmed gain control of the copending application is as follows: A high frequency gain control signal generating system comprised of the high frequency oscillator 10 is coupled to a variable attenuator 58. The output 23 of the variable attenuator is sampled through rectifier 26 and resistor 27, and by means of a summing amplifier or comparator 28 is compared with a reference voltage which may be generated by the resistance-capacitance network comprised of a resistor 40 and capacitor 39. As described in the copending Ford et al. application, the output voltage at 23 decreases or increases according to a decrease or increase in the reference voltage applied through resistor 29. This is done by applying the difference voltage from the summing amplifier 28 to a light source 31 through the amplifier 30 wherein the intensity of the light is proportional to the voltage applied thereto. The light 31 is optically coupled to a pair of photosensitive resistors 13 and 18 within the variable attenuator circuit 58. As the intensity of the light increases the resistance of the photosensitive resistors decrease, and as a result, the amplitude of the high frequency signal at the output 23 decreases. The reference voltage generated by the resistor 40-capacitor 39 network 40-39 is an exponentially decaying voltage function, which decays to a pre-selected minimum value determined by the clamping voltage existing at the interconnection of diodes 41 and 46 as set by the voltage divider network comprised of battery 49, resistor 48 and terminal 47. Once the decay of the resistor-capacitor network has obtained this minimum voltage, the voltage on the line 42 is clamped and constant at that value, and as a consequence the amplitude of the high frequency signal at the output 23 remains constant. For convenience the various components and connections within the programmed gain control of FIGURE 1 have been labeled the same as shown in FIGURE 1 of the copending Ford et al. application. Some of the components within the variable attenuator 60 have not been shown for sake of brevity, since an adequate discussion thereof is given in the said copending application.

It will be noted that the resistor-capacitor network 40-39 of the programmed gain control is not initially connected to a constant reference voltage 35 as shown in the copending application, the reason for which will become apparent in the following. There is shown in FIGURE 1 a series of seismic amplifiers 62 connected to an array of seismometers (not shown) by means of inputs 61, the outputs 63 being connected to suitable recording apparatus (not shown). The seismometer array can take on any geometrical configuration, such as a linear array, for example, all of which is well known in the art. According to the invention the initial amplitude of the incoming seismic signal reaching the seismometer array is sampled to set the initial gain of the programmed gain control. For this purpose an average of the initial amplitude of the incoming seismic signal reaching several seismometers is sampled, as is shown by deriving signals from the outputs 64 from four seismic amplifiers. The particular seismometers sampled are preferably chosen to give a representative or average value of the incoming seismic signal amplitude, such as for example, every third or fourth seismometer in the array, excluding the seismometers closest to and farthest from the shot point so as to preclude an excessively high or low amplitude. The sampled outputs from the seismometers are applied through a line 65 to a summing amplifier 66, a phase splitter and amplifier 67 and a full wave rectifier 68. Any suitable summing amplifier can be used, such as, for example, a Philbrick operational amplifier. The phase splitter and amplifier may comprise, for example, parallel amplification paths, one of which consists of a single amplification stage and the other of which consists of two amplification stages such that the signals from the parallel stages will be 180° out of phase with each other, and the total amplifications of the parallel paths are the same. The outputs from the amplifiers are then rectified by a diode full wave rectifier circuit. These functional circuits are well known in the art and will not be described in detail here. The D.C. voltage from the rectifier 68 is then applied to an emitter follower circuit 69 for impedance matching purposes, the output of which emitter follower is applied along line 70 through switch 72 and line 74 to the resistance-capacitance network 40-39 of the programmed gain control. The D.C. voltage from the rectifier is proportional to the average initial amplitude of the incoming seismic signal and is used to charge the capacitor 39 during this time. The emitter follower 69 is used to provide a low impedance charging path for the capacitor and to match the charging path to the high output impedance of the rectifier.

Figure 2:
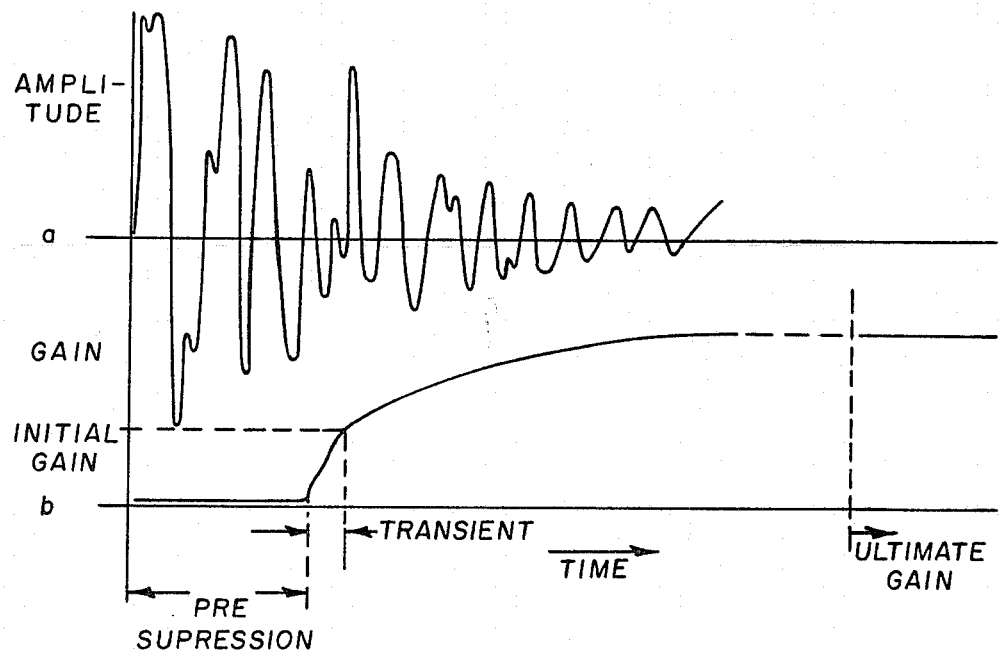
FIGURE 2 is a graphic representation of the amplitude as a function of time of the incoming seismic signal and the gain as a function of time of the seismic amplifiers as determined by the method and apparatus of this invention.

A graphical representation of the initial surface noise 100 and the incoming seismic signal 102 is shown in FIGURE 2 in conjunction with a composite gain function of the seismic amplifier. It will be noted that between the time of the initial seismic shot and the time the seismic signal 102 arrives at the seismometer, there is a considerable amount of irregular surface noise. During this time, which is designated as pre-suppression in FIGURE 2, the switch 54 of the programmed gain control of FIGURE 1, the switch 72 and the switch 76 are maintained in the auto position as shown. When switch 54 is in the auto position a constant D.C. voltage from supply 35 is applied to the voltage comparator 28. This voltage is normally about −28 volts and maintains the output of the programmed gain control at a constant amplitude, which in turn maintains a constant input to the seismic amplifiers 62. That is to say, the amplitude of the 7.5 kc. signal is maintained at a relatively large, constant value. Since the gains of the amplifiers are inversely proportional to the amplitude of the 7.5 kc. signal, the amplifiers will be maintained at a low gain during the time when switch 54 is in the auto position. This gives the initial suppression of the surface noise 100 as shown in FIGURE 2.

Normally, the period of time between the initial seismic shot as represented by zero time on the graph and the time in which the seismic signal arrives at the seismometer array is about 100 milliseconds. The switches 54 and 72 are maintained in the auto position for a short period of time after the initial arrival of the seismic signals at the seismometer array, say for about 100 milliseconds, for example, the result of which is that capacitor 39 charges or discharges proportional to the average initial amplitude of the seismic signal arriving at the seismometer array. Then, a time break signal generator 44 is utilized to actuate relays 56 and 73 to change switches 54 and 72, respectively, to the position designated as normal. The capacitor 39 is charged to a value proportional to the average initial amplitude of the seismic signal at the instant of switching from auto to normal. At this time the capacitor 39 starts to decay through resistance 40 thus causing the D.C. voltage applied to the comparator 28 through resistor 29 to change. A rapidly decreasing voltage will be applied to the comparator 28 to decrease the voltage from the value established by voltage supply 35 to whatever the voltage is on the capacitor 39. The amplitude of the 7.5 kc. signal at the output 23 of the programmed gain control will vary accordingly and take on a value proportional to the voltage on the capacitor 39. The amplitude of the 7.5 kc. signal will then decrease exponentially as the capacitor 39 discharges through resistor 40.

The gain which is inversely proportional to the amplitude of the 7.5 kc. signal is shown in FIGURE 2b, the fast transient in the gain of the amplifiers being shown when the switches are actuated from auto to normal position. The level designated initial gain is proportional to the voltage on the capacitor 39 at the time of switching to normal operation. As seen in FIGURE 2b the gain of the amplifiers is controlled by normal programmed gain control for the duration of the seismic signal. When the capacitor 39 has discharged to a voltage equal to the voltage at the interconnection of diodes 41 and 46 as determined by the voltage supply 49 and resistance 48, the voltage applied to the comparator 28 will no longer decrease and the amplifiers will maintain a constant gain throughout the rest of the seismic signal, which is referred to as the ultimate gain of the programmed gain control.

During the time between the pre-suppression period and the time of switching to normal program gain control operation when the capacitor 39 is charged proportional to the average amplitude of the seismic signal, the capacitor 78 is likewise being charged to this value through switch 76 connected at line 70. The capacitor 78 is connected to a meter 82, such as microammeter, through an impedance matching emitter follower circuit 80. The switch 76 is likewise actuated to normal position by the time break signal generator 44 at the same time as are switches 64 and 72. Because of the high impedance of the emitter follower circuit 80, the capacitor 78 cannot discharge after switch 76 is actuated to normal position. The meter 82 then detects the voltage at the output of emitter follower which is proportional to the voltage across the capacitor 78. Thus the initial amplitude of the incoming seismic signal can be determined, and the advantage of knowing the initial gain will be readily apparent to those skilled in the art.

The method as described in conjunction with FIGURE 1 sets the initial gain of the seismic amplifiers as determined by the average initial amplitude of the seismic signals. As discussed earlier, the gains of the amplifiers are initially suppressed for the period between the time of the seismic shot and the time the seismic signal arrives, and thereafter the initial gain is set automatically at the proper value, namely, the average initial amplitude of the seismic signal. The gains of the amplifiers are then controlled by normal programmed gain control operation which is normally an exponential increase in gain with time. It should be noted in conjunction with FIGURE 1 that any suitable means can be used to charge the capacitor 39 to the average initial magnitude of the seismic signal and that the circuitry shown and described is merely illustrative of suitable apparatus for carrying out this method.

Likewise, any program gain controlled system can be used in conjunction with this method in which the initial gain is set by the average initial amplitude of the seismic signal.

Figure 3:
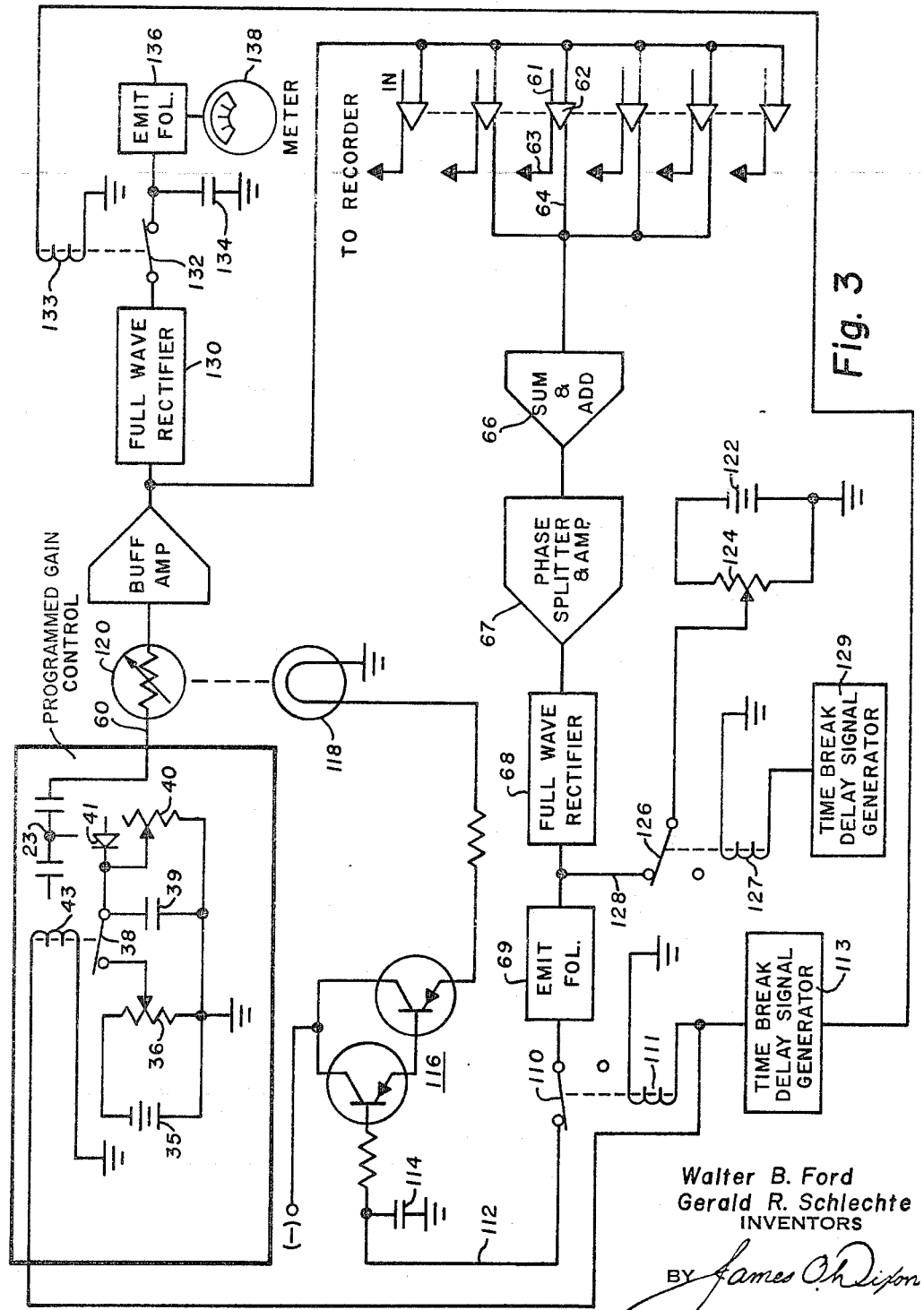
FIGURE 3 is a schematic representation of illustrative circuitry for carrying out the preferred method of this invention.

The fast transient time shown in FIGURE 2b between the time the amplifiers are operating in the pres-suppression region and the time that they are operating at the initial gain as set by the capacitor 39 is sometimes undesirable if the difference in the pre-suppression gain and the initial gain is too large. That is to say, the gain response of the amplifiers in decibels per second is sometimes exceeded by the transient and thus the amplifier will not be able to follow this initial rise in gain as quickly as it should. There is shown in FIGURE 3 a schematic representation of different circuitry for carrying out the preferred method of the invention, which method precludes any occurrence of the fast transient between the gain in the pre-suppression region and the initial gain as determined by the capacitor 39. The method to be carried out is similar to that described in conjunction with FIGURE 1 in that the initial gain of the programmed gain control is determined by a voltage across the capacitor, which voltage is proportional to the average initial amplitude of the seismic signal. The circuitry by which this is accomplished, however, is entirely different from that shown in FIGURE 1 and includes a closed loop system permitting the amplitude of a seismic signal to control the amplitude of the 7.5 kc. signal from the programmed gain control, which signal controls the gain of the seismic amplifiers. The function of such a closed loop system is referred to as automatic gain control (A.G.C.) whereby the gain of the amplifiers is controlled by, and is inversely proportional to, the amplitude of the seismic signal. During this time the capacitor setting the initial gain of the programmed gain control system is charged proportional to the amplitude of the seismic signal. When the entire system is switched from automatic gain control to programmed gain control, the seismic amplifiers are already adjusted to the initial gain, and thus no rapid transient from the gain at pre-suppression to the initial gain occurs.

Specifically, the outputs 64 of several seismometers 62 are added and amplified by amplifier 66 and fed to the phase splitter and amplifier 67, and then rectified as described with reference to FIGURE 1. The output from the emitter follower 69 is connected to a capacitor 114 through switch 110 along line 112, and when switch 110 is closed, the capacitor 114 is charged to a voltage equal to the output voltage of the emitter follower 69. The voltage on the capacitor 114 is applied to a lamp 118 similar to lamp 31 in FIGURE 1 through an impedance matching device, such as a Darlington emitter follower 116, for example. Because of the low impedance of the output of the emitter follower 116, the lamp can draw a sufficient operating current which is determined by the voltage on the capacitor 114. The lamp 118 is optically coupled to a photosensitive device 120 similar to the photosensitive devices 13 and 18 in FIGURE 1, whereby the resistance of the device 120 is proportional to the brightness of the lamp 118. A programmed gain control system essentially as described in the Ford et al copending application, supra, is enclosed within the solid line and labeled as such, the output 23 being connected to one terminal of the photosensitive device 120 as shown. The other terminal of the device 120 is connected to the inputs of the seismic amplifiers through a conventional buffer amplifier, the latter protecting the device 120. For sake of brevity, only the portion of the program gain control that includes the initial gain capacitor 39 is shown, it being understood that the operation of the program gain control system is the same as described earlier.

During the initial suppression period when it is desired to maintain the seismic amplifiers at a low gain, a constant negative voltage from voltage supply 122 through resistor 124 is applied to the input of the emitter follower 69 through switch 126 along line 128. This voltage is normally greater in magnitude than any voltage sampled through the seismic amplifiers, thus maintaining the capacitor 114 at a constant voltage and the lamp 18 at a constant intensity. Because of the relatively large magnitude of the voltage 122, the resistance of the device 120 will be very low and will provide little impedance in the path between the programmed gain control and the input to the seismic amplifiers. During the same pre-suppression period switch 38 of the programmed gain control is connected to the negative supply voltage 35 through resistor 36, thus maintaining a constant voltage on the capacitor 39. This is the condition as described in the copending application, supra, in which the 7.5 kc. output from the programmed gain control is at a relatively high and constant amplitude. Consequently, the amplifiers are maintained at a low gain.

After the pre-suppression period and upon the arrival of the seismic signal at the seismometers, a time break delay signal generator 129 actuates a relay 127, which relay moves the switch 126 down to its lower position to disconnect the power supply 122 from the input of the emitter follower 69. Thereafter, the voltage on the capacitor 114 is charged or discharged proportional to the average initial amplitude of the incoming seismic signal. Likewise the brightness of the lamp 118 varies as a function of the voltage on the capacitor 114 as does the resistance of the device 120. Thus as the voltage on the capacitor decreases as a result of decreasing amplitude of the seismic signal, the intensity of the lamp 118 decreases, causing the resistance of the device 120 to increase. As a result, the amplitude of the 7.5 kc signal reaching the input of the seismic amplifiers is decreased causing the gain of the amplifiers to increase. This operation is continued for a brief period, say about 100 milliseconds, whereupon the system is switched into its normal programmed gain control operation. During this time the gain of the amplifiers is controlled by and proportional to the average initial amplitude of the seismic signal, which, as noted earlier, is referred to as A.G.C. This ensures that the gain of the amplifiers is increased in response to the decrease in amplitude, as a function of time, of the initial seismic signal.

Figure 4:
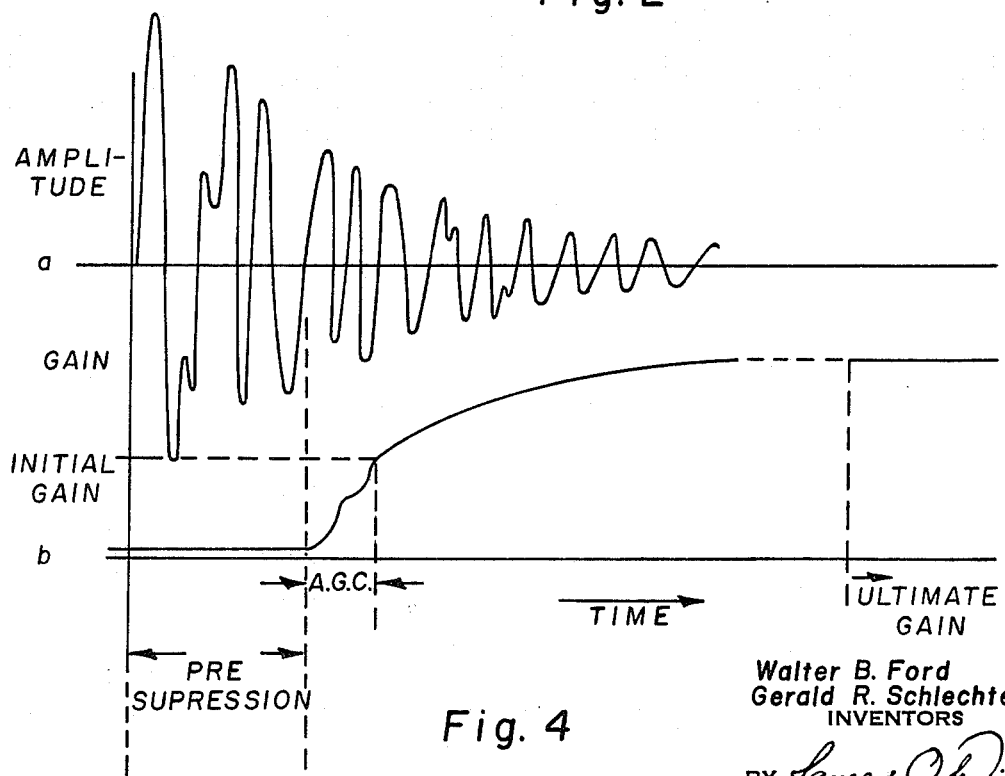
FIGURE 4 is a graphic representation of the amplitude as a function of time of the incoming seismic signal and the gain as a function of time of the seismic amplifiers as determined by the preferred method and apparatus of the invention.

Referring to FIGURE 4 there is shown a graphical representation of the surface noise and the amplitude of the seismic signal as a function of time similar to that shown in FIGURE 2. There is also shown the gain of a seismic amplifier as a function of time. As described the amplifiers are maintained at low gain during the pre-suppression period until the switch 126 disconnects the supply 122 from the input of the emitter follower 69, whereupon the gain of the amplifiers increases according to the decrease of the amplitude of the seismic signal, i.e., automatic gain control operation.

After the brief period during which A.G.C. controls the operation of the system, a delay circuit signal generator actuates relays 111 and 43 to disconnect the capacitor 114 from the output of the emitter follower and to disconnect the capacitor 39 from the supply voltage 35, respectively. Because of the high input impedance of the emitter follower 116 the capacitor 114 cannot discharge but maintains a constant voltage, as a result of which the lamp intensity 118 remains constant. Likewise, the resistance of the device 120 remains constant. As switch 38 is opened the capacitor 39 discharges through resistor 40 as noted earlier. The amplitude of the 7.5 kc. signal then decreases exponentially at the output 60, said amplitude is attenuated accordingly by the resistance of the device 120, and the gain of the amplifier 62 is increased exponentially. The exponential increase in gain is shown in the normal operating mode in FIGURE 4b. Also as noted earlier, once the capacitor is discharged to the clamping voltage, the gain of the amplifier is maintained constant and is denoted ultimate gain in FIGURE 4b.

It will be seen from FIGURE 4b that the time between the pre-suppression and the normal operation can be adjusted as desired by the delay circuit signal generator 113.

Moreover, since the gain of the amplifiers has already been increased to the value proportional to the amplitude of the seismic signals when the system is switched to initial gain and normal program gain control, the amplifiers are not required to respond to a fast rise in gain as is required in the circuit of FIGURE 1. In other words, there is a relatively smooth transition from the gain during the pre-suppression period to the gain in the normal operating mode.

The method performed in conjunction with the circuit of FIGURE 3 comprises the setting of an initial gain of the programmed gain control in accordance with and proportional to the average initial amplitude of the seismic signal, but in addition, the gain of the amplifiers is controlled by the average initial amplitude of the seismic signals for a brief period until the amplifiers have obtained the initial gain. At that time the operation is switched to normal programmed gain control.

A metering circuit similar to that shown in FIGURE 1 is connected between the buffer amplifier and the input to the seismic amplifiers so that the exact gain can be determined at the time the system is switched to programmed gain control from the automatic gain control. Because of the high frequency voltage a full wave rectified 130 is used to provide a D.C. voltage and is connected to a capacitor 134 through switch 132. A meter 138 is connected to the capacitor through emitter follower 136 as shown in FIGURE 1. A relay 133 actuates the switch 132 to break the circuit between the rectifier and capacitor at the same instant the delay signal generator 113 actuates relays 111 and 43. The voltage on the capacitor 134 will be proportional to the average amplitude of the seismic signals at the instant when the system is switched from the automatic gain control operation to the normal programmed gain control.

The invention, as described with reference to preferred embodiments thereof, should not be construed as limited to same, but is to be limited only as defined in the appended claims.

What is claimed is:

1. In a system for receiving and amplifying a seismic signal derived from a seismic disturbance, said system including a seismometer connected to an amplifier, the method of controlling the gain of said amplifier which comprises the steps of
    (a) sampling the amplitude of said seismic signal upon its initial arrival at said seismometer and for a predetermined period thereafter,
    (b) setting the gain of said amplifier proportional to said amplitude at the end of said period, and
    (c) thereafter varying said gain according to a preselected function of time.

2. In a system for receiving and amplifying a seismic signal derived from a seismic disturbance, said system including a seismometer connected to an amplifier, the method of controlling the gain of said amplifier which comprises the steps of
    (a) sampling the amplitude of said seismic signal upon its arrival at said seismometer and for a predetermined period thereafter while maintaining said gain constant during said period,
    (b) setting the gain of said amplifier proportional to said amplitude at the end of said period, and
    (c) thereafter varying said gain according to a preselected function of time.

3. In a system for receiving and amplifying a seismic signal derived from a seismic disturbance, said system including a seismometer connected to an amplifier, the method of controlling the gain of said amplifier which comprises the steps of
    (a) maintaining the gain of said amplifier constant during the time interval between said seismic disturbance and the initial arrival of said seismic signal at said seismometer and during a predetermined period thereafter, (b) sampling the amplitude of said seismic signal during said period,
(c) setting the gain of said amplifier proportional to said amplitude at the end of said period, and
(d) thereafter varying said gain according to a preselected function of time.

4. In a system for receiving and amplifying a seismic signal derived from a seismic disturbance, said system including a seismometer connected to an amplifier, the method of controlling the gain of said amplifier which comprises the steps of
(a) sampling the amplitude of said seismic signal upon its initial arrival at said seismometer and for a predetermined period thereafter and varying the gain of said amplifier as a function of said amplitude during said period, and
(b) thereafter varying said gain according to a preselected function of time.

5. In a system for receiving and amplifying a seismic signal derived from a seismic disturbance, said system including a seismometer connected to an amplifier, the method of controlling the gain of said amplifier which comprises the steps of
(a) maintaining the gain of said amplifier constant during the time interval between said seismic disturbance and the initial arrival of said seismic signal at said seismometer,
(b) sampling the amplitude of said seismic signal upon its initial arrival at said seismometer and for a predetermined period thereafter and varying the gain of said amplifier as a function of said amplitude during said period, and
(c) thereafter varying said gain according to a preselected function of time.

6. In a system for receiving and amplifying a seismic signal derived from a seismic disturbance, said system including a seismometer connected to an amplifier, the method of controlling the gain of said amplifier which comprises the steps of
(a) sampling the amplitude of said seismic signal upon its arrival at said seismometer and for a predetermined period thereafter while maintaining said amplifier at a low gain during said period,
(b) setting the gain of said amplifier proportional to said amplitude at the end of said period, and
(c) thereafter varying said gain according to a preselected function of time.

7. In a system for receiving and amplifying a seismic signal derived from a seismic disturbance, said system including a seismometer connected to an amplifier, the method of controlling the gain of said amplifier which comprises the steps of
(a) maintaining said amplifier at a low gain during the time interval between said seismic disturbance and the initial arrival of said seismic signal at said seismometer and during a predetermined period thereafter,
(b) sampling the amplitude of said seismic signal during said period,
(c) setting the gain of said amplifier proportional to said amplitude at the end of said period, and
(d) thereafter varying said gain according to a preselected function of time.

8. In a system for receiving and amplifying a seismic signal derived from a seismic disturbance, said system including a seismometer connected to an amplifier, the method of controlling the gain of said amplifier which comprises the steps of
(a) maintaining said amplifier at a low gain during the time interval between said seismic disturbance and the initial arrival of said seismic signal at said seismometer,
(b) sampling the amplitude of said seismic signal upon its initial arrival at said seismometer and for a predetermined period thereafter and varying the gain of said amplifier as a function of said amplitude during said period, and
(c) thereafter varying said gain according to a preselected function of time.

9. Apparatus for receiving and amplifying a seismic signal derived from a seismic disturbance, comprising
(a) a seismometer,
(b) an amplifier having its input connected to the output of said seismometer,
(c) means connected to the output of said amplifier for sampling the amplitude of said seismic signal upon its initial arrival at said seismometer and for a predetermined period thereafter,
(d) means for generating an electrical signal and for varying its magnitude according to a preselected function of time,
(e) means responsive to the output of said sampling means for setting the magnitude of said electrical signal proportional to the amplitude of said seismic signal at the end of said period, and
(f) means responsive to said electrical signal generating means for controlling the gain of said amplifier as a function of said magnitude.

10. Apparatus for receiving and amplifying a seismic signal derived from a seismic disturbance, comprising
(a) a seismometer,
(b) an amplifier having its input connected to the output of said seismometer,
(c) means connected to the output of said amplifier for sampling the amplitude of said seismic signal upon its initial arrival at said seismometer and for a predetermined period thereafter,
(d) an electrical signal generating means,
(e) means responsive to said electrical signal generating means for controlling the gain of said amplifier as a function of the magnitude of said electrical signal,
(f) means connected to said electrical signal generating means for maintaining said magnitude constant during said period,
(g) means responsive to said sampling means for setting said magnitude proportional to said amplitude at the end of said period, and
(h) means effective after said period for varying said magnitude according to a preselected function of time.

11. Apparatus for receiving and amplifying a seismic signal derived from a seismic disturbance, comprising
(a) a seismometer,
(b) an amplifier having its input connected to the output of said seismometer,
(c) means connected to the output of said amplifier for sampling the amplitude of said seismic signal upon its initial arrival at said seismometer and for a predetermined period thereafter,
(d) an electrical signal generating means,
(e) means responsive to said electrical signal generating means for controlling the gain of said amplifier as a function of the magnitude of said electrical signal,
(f) means responsive to said sampling means for controlling said magnitude according to said amplitude during said period, and
(g) means effective after said period for varying said magnitude according to a preselected function of time.

References Cited by the Examiner

UNITED STATES PATENTS

| | | | |
|---|---|---|---|
| 2,838,742 | 6/1958 | McManis | 340—15.5 |
| 2,982,919 | 5/1961 | Montgomery | 340—15.5 |

BENJAMIN A. BORCHELT, *Primary Examiner.*

R. M. SKOLNIK, *Assistant Examiner.*